(12) United States Patent
Uetani et al.

US009533475B2

(10) Patent No.: US 9,533,475 B2
(45) Date of Patent: Jan. 3, 2017

(54) CROSSLINKING POLYMER-SUPPORTED POROUS FILM FOR BATTERY SEPARATOR AND METHOD FOR PRODUCING BATTERY USING THE SAME

(75) Inventors: Yoshihiro Uetani, Ibaraki (JP);
Keisuke Kii, Ibaraki (JP); Satoshi Nishikawa, Takatsuki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 13/554,280

(22) Filed: Jul. 20, 2012

(65) Prior Publication Data

US 2012/0297612 A1 Nov. 29, 2012

Related U.S. Application Data

(62) Division of application No. 10/724,882, filed on Dec. 2, 2003, now abandoned.

(30) Foreign Application Priority Data

Dec. 2, 2002 (JP) .................................. 2002-350223

(51) Int. Cl.
| | |
|---|---|
| *H01M 10/04* | (2006.01) |
| *B32B 27/30* | (2006.01) |
| *H01M 2/14* | (2006.01) |
| *H01M 2/16* | (2006.01) |
| H01M 10/052 | (2010.01) |
| H01M 10/0565 | (2010.01) |

(52) U.S. Cl.
CPC .............. *B32B 27/30* (2013.01); *H01M 2/145* (2013.01); *H01M 2/1653* (2013.01); *H01M 2/1686* (2013.01); *H01M 2/1673* (2013.01); *H01M 10/052* (2013.01); *H01M 10/0565* (2013.01); *H01M 2300/0082* (2013.01); *H01M 2300/0085* (2013.01); *Y02E 60/122* (2013.01); *Y02P 70/54* (2015.11); *Y10T 29/49112* (2015.01)

(58) Field of Classification Search
CPC .................................................. H01M 2/145
See application file for complete search history.

(56) References Cited

U.S. PATENT DOCUMENTS

| | | |
|---|---|---|
| 5,238,735 A | 8/1993 | Nagou et al. |
| 5,244,944 A | 9/1993 | Bott et al. |
| 5,667,893 A | 9/1997 | Kinzer et al. |
| 6,340,716 B1 * | 1/2002 | Armand et al. ............ 522/31 |
| 2003/0064282 A1 | 4/2003 | Nakagawa et al. |
| 2004/0101757 A1 | 5/2004 | Kii et al. |

FOREIGN PATENT DOCUMENTS

| | | | |
|---|---|---|---|
| CN | 1362711 A | | 8/2002 |
| EP | WO 00/33406 | * | 6/2000 |
| EP | 1 271 673 A1 | | 1/2003 |
| JP | 8-034959 | | 2/1996 |
| JP | 10-172606 A | | 6/1998 |
| JP | 10-177865 A | | 6/1998 |
| JP | 10-189054 A | | 7/1998 |
| JP | 10-212461 | | 8/1998 |
| JP | 2001-148175 | | 5/2001 |
| JP | 2001176555 A | * | 6/2001 |
| JP | 2002-110245 | | 4/2002 |
| JP | 2002110245 A | * | 4/2002 |
| JP | 2002-166401 | | 6/2002 |
| JP | 2003-142158 A | | 5/2003 |
| WO | 00/03449 | | 1/2000 |
| WO | 01/75991 A1 | | 10/2001 |

OTHER PUBLICATIONS

Japanese Office Action dated Sep. 16, 2008.
Japanese language Office Action dated May 31, 2007.
European Search Report dated Jan. 31, 2006.
Chinese Office Action dated May 26, 2006.

* cited by examiner

*Primary Examiner* — Barbara Gilliam
*Assistant Examiner* — Stephan Essex
(74) *Attorney, Agent, or Firm* — Sughrue Mion, PLLC

(57) ABSTRACT

The method for producing a battery, includes the steps of: laminating electrodes on the crosslinking polymer-supported porous film to prepare a laminate of crosslinking polymer-supported porous film/electrodes; placing the laminate in a battery container; and pouring an electrolyte solution containing a cation polymerization catalyst in the battery container to induce cation polymerization and crosslinking of the crosslinking polymer, thereby at least partially gelling the electrolyte solution to adhere the porous film and the electrodes.

3 Claims, No Drawings

CROSSLINKING POLYMER-SUPPORTED POROUS FILM FOR BATTERY SEPARATOR AND METHOD FOR PRODUCING BATTERY USING THE SAME

This application is a divisional of application Ser. No. 10/724,882, which claims priority from JP 2002-350223 filed Dec. 2, 2002, the contents of all of which are incorporated herein by reference in their entirety.

FIELD OF THE INVENTION

The present invention relates to a crosslinking polymer-supported porous film for battery separator, comprising a porous film substrate having supported thereon a crosslinking polymer having plural cation-polymerizable functional groups in the molecule, and a method for producing a battery by adhering electrodes to a separator using the crosslinking polymer-supported porous film.

DESCRIPTION OF THE RELATED ART

In recent years, lithium ion secondary batteries with high energy density have been widely used as a power source of small-type hand-held electronic devices such as cell phone and laptop personal computer. Such lithium ion secondary batteries are produced by a process including a step of laminating or winding, for example, a polyolefin resin-porous film on or around positive and negative electrodes in a sheet form to place the resulting laminate in a battery container made of, for example, a metal can, a step of pouring an electrolyte solution in the battery container, and a step of sealing the battery container or sealing the opening of the battery container.

However, very strong demands for downsizing such small-type hand-held electronic devices as described above into small weight have prevailed recently. Lithium ion secondary batteries of a thinner type and a smaller weight have been desired. Therefore, battery containers of laminate seal type are now used in place of the conventional metal can containers.

Compared with the conventional metal can containers, such battery containers of laminate seal type have the following disadvantages. Because face pressure for maintaining the electric connection between the separator and the electrodes cannot sufficiently be applied to the face of the electrodes, the distance between the electrodes partially gets longer over time due to the expansion and shrinkage of electrode active substances during the charge or discharge of the battery. Thus, the internal resistance of the battery increases, involving deterioration of the battery performance. Additionally, the occurrence of resistance variation inside the battery also disadvantageously deteriorates the battery performance.

In the case of producing a sheet-like battery of a large area, the distance between the electrodes cannot be fixed, so that satisfactory battery performance cannot be obtained due to the resulting resistance variation inside the battery.

To overcome the above-described problems, it has conventionally been proposed to join electrodes and a separator by an adhesive resin layer comprising an electrolyte solution phase, a polymer gel layer containing an electrolyte solution and a polymer solid phase (for example, JP-A-10-177865). It is further proposed to obtain a battery comprising electrodes adhered to a separator, by coating a separator with a binder resin solution containing a poly(vinylidene fluoride) resin as the main component, superposing electrodes thereon, followed by drying to prepare a battery laminate, charging the battery laminate in a battery container, and pouring an electrolyte solution in the battery container (for example, JP-A-10-189054).

It is also proposed to obtain a battery comprising electrodes adhered to a separator, by joining a separator impregnated with an electrolyte solution to positive and negative electrodes through a porous adhesive resin layer for closely contacting those, and holding the electrolyte solution in the through holes (for example, JP-A-10-172606).

According to those processes, however, thickness of the adhesive resin layer must increase in order to obtain sufficient adhesive force between the separators and the electrodes. Further, because the amount of the electrolyte solution relative to the adhesive resin cannot increase, the internal resistance of the resulting batteries is high, so that satisfactory cycle performance and high-rate discharge performance cannot be obtained, which is disadvantageous.

SUMMARY OF THE INVENTION

The invention has been made to overcome the problems in the production of batteries by adhering electrodes to separators.

Accordingly, one object of the present invention is to provide a surface-treated porous film having a polymer supported thereon, for a battery separator, which can suitably be used for the production of a battery having sufficient adhesiveness between electrodes and a separator, low internal resistance and high-rate performance.

Another object of the present invention is to provide a method for producing a battery using the surface-treated porous film.

According to the present invention, there is provided a crosslinking polymer-supported porous film for battery separator, comprising a porous film substrate having supported thereon a crosslinking polymer having plural cation-polymerizable functional groups in the molecule.

According to the present invention, there is further provided a method for producing a battery, comprising:

laminating electrodes on the crosslinking polymer-supported porous film to prepare a laminate of crosslinking polymer-supported porous film/electrodes, placing the laminate in a battery container, and pouring an electrolyte solution containing a cation polymerization catalyst in the battery container to induce cation polymerization and crosslinking of the crosslinking polymer, thereby at least partially gelling the electrolyte solution to adhere the porous film and the electrodes.

DETAILED DESCRIPTION OF THE INVENTION

The crosslinking polymer-supported porous film for battery separator in accordance with the present invention comprises a porous film substrate having supported thereon a crosslinking polymer having plural cation-polymerizable functional groups in the molecule.

The porous film substrate has a thickness of preferably 3-50 μm. If the porous film has a thickness less than 3 μm, the film strength is insufficient, and when such a porous film is used as the battery separator, the electrodes may cause internal short circuit. On the other hand, when the porous film has a thickness exceeding 50 μm, the battery using such a porous film as the separator has too large distance between the electrodes, so that the internal resistance of the battery is excessive.

The porous film substrate used has pores having a mean pore diameter of 0.01-5 μm and a porosity of 20-95%, preferably 30-90%, and more preferably 40-85%. When the porosity ratio is too low, such a porous film when used as a battery separator causes reduction in ionic conduction paths so that sufficient battery performance cannot be obtained. On the other hand, when the porosity ratio is too high, the strength of the film when used as a battery separator is insufficient. In such a case, a porous film substrate having further large thickness has to be used in order to obtain the required strength. This results in unfavorable increase in the internal resistance of the battery.

The porous film has an air permeability of 1,500 seconds/100 cc or smaller, and preferably 1,000 second/100 cc or smaller. When the permeability is too high, such a film when used as a battery separator has low ionic conductivity, so that sufficient battery performance cannot be obtained. Further, the porous film substrate preferably has a puncture strength of 1N or more. When the puncture strength is less than 1N, the substrate breaks when the face pressure is applied to between the electrodes, which may cause internal short circuit.

According to the present invention, the porous film substrate is not particularly limited so long as it has the above-described properties. Considering solvent resistance and redox resistance, a porous film comprising polyolefin resins such as polyethylene and polypropylene is preferably used. Of those, polyethylene resin film is particularly preferably used as the porous film for the reason that the film has a property such that when heated, the resin melts and clogs the pores, thereby giving a so-called shutdown function to the battery. The polyethylene resin used herein includes not only ethylene homopolymer but also copolymers of ethylene with α-olefins such as propylene, butene and hexene. Further, laminate films of porous films such as polytetrafluoroethylene and polyimide with the polyolefin resin porous film have excellent heat resistance. Therefore, such laminate films are also preferably used as the porous film substrate in the present invention.

The crosslinking polymer-supported porous film for battery separator in accordance with the present invention comprises the above-described porous film substrate having supported thereon a crosslinking polymer having plural cation-polymerizable functional groups in the molecule.

The crosslinking polymer used in the present invention preferably is polymers having a plurality of at least one cation-polymerizable functional group selected from 3-oxetanyl group and epoxy group (2-oxysilanyl group) in the molecule. The crosslinking polymer particularly preferably used is a polymer having plural 3-oxetanyl groups in the molecule (hereinafter referred to as "3-oxetanyl group-containing crosslinking polymer" for simplicity) or a polymer having plural epoxy groups in the molecule (hereinafter referred to as "epoxy group-containing crosslinking polymer" for simplicity). Such 3-oxetanyl group-containing crosslinking polymer and epoxy group-containing crosslinking polymer are described in, for example, JP-A-2001-176555 and JP-A-2002-110245.

The 3-oxetanyl group-containing crosslinking polymer is preferably a radical copolymer of a radical-polymerizable monomer having 3-oxetanyl group (hereinafter referred to as "3-oxetanyl group-containing radical-polymerizable monomer" for simplicity) with other radical-polymerizable monomer. Similarly, the epoxy group-containing crosslinking polymer is preferably a radical copolymer of a radical-polymerizable monomer with epoxy group (hereinafter referred to as "epoxy group-containing radical-polymerizable monomer" for simplicity) with other radical-polymerizable monomer.

The 3-oxetanyl group-containing radical-polymerizable monomer preferably used is 3-oxetanyl group-containing (meth)acrylate represented by the following formula (I):

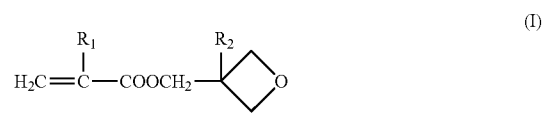

wherein $R_1$ represents hydrogen atom or methyl group; and $R_2$ represents hydrogen atom or an alkyl group having 1-6 carbon atoms.

Examples of the 3-oxetanyl group-containing (meth)acrylate include 3-oxetanylmethyl(meth)acrylate, 3-methyl-3-oxetanylmethyl(meth)acrylate, 3-ethyl-3-oxetanylmethyl(meth)acrylate, 3-butyl-3-oxetanylmethyl(meth)acrylate, and 3-hexyl-3-oxetanylmethyl(meth)acrylate. These (meth)acrylates can be used alone or as mixtures of two or more thereof. The term "(meth)acrylate" used herein means acrylate or methacrylate.

The epoxy group-containing radical-polymerizable monomer preferably used is an epoxy group-containing (meth)acrylate represented by the following formula (II):

wherein $R_3$ represents hydrogen atom or methyl group; and $R_4$ represents an epoxy group-containing group represented by the following formula (1) or (2):

Examples of the epoxy group-containing (meth)acrylate include 3,4-epoxycyclohexylmethyl(meth)acrylate, and glycidyl(meth)acrylate. These (meth)acrylates can be used alone or as mixtures of two or more thereof.

The other radical-polymerizable monomer to be copolymerized with such 3-oxetanyl group-containing radical-polymerizable monomer or epoxy group-containing radical-polymerizable monomer is preferably at least one selected from (meth)acrylates represented by the following formula (III):

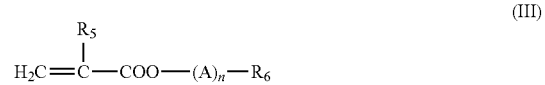

wherein $R_5$ represents hydrogen atom or methyl group; A represents an oxyalkylene group having 2 or 3 carbon atoms (preferably, oxyethylene group or oxypropylene group): $R_6$ represents an alkyl group having 1-6 carbon atoms or a fluorinated alkyl group having 1-6 carbon atoms; and n is an integer of 0-3, and vinyl ester represented by the following formula (N):

(IV)

wherein $R_7$ represents methyl group or ethyl group; and $R_8$ represents hydrogen atom or methyl group.

Examples of the (meth)acrylate represented by the formula (III) include methyl(meth)acrylate, ethyl(meth)acrylate, propyl(meth)acrylate, butyl(meth)acrylate, 2,2,2-trifluoroethyl(meth)acrylate, and 2,2,3,3-tetrafluoropropyl (meth)acrylate. Other than those, for example, compounds represented by the following formulae can be used.

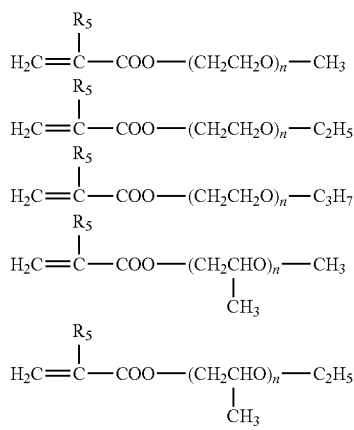

wherein n is an integer of 0-3.

Examples of the vinyl ester represented by the formula (IV) include vinyl acetate and vinyl propionate.

The 3-oxetanyl group-containing crosslinking polymers and the epoxy group-containing crosslinking polymers are preferably obtained as radical copolymers via radical copolymerization of the 3-oxetanyl group-containing radical-polymerizable monomer or the epoxy group-containing radical-polymerizable monomer with other radical-polymerizable monomer using radical polymerization initiators as described above. The radical copolymerization can be conducted by any polymerization processes such as solution polymerization, bulk polymerization, suspension polymerization or emulsion polymerization. From the standpoints of ease of polymerization, molecular weight adjustment and post-treatment, the radical copolymerization is preferably conducted by solution polymerization or suspension polymerization.

The radical polymerization initiators are not particularly limited, and examples thereof include N,N'-azobisisobutyronitrile, dimethyl N,N'-azobis(2-methylpropionate), benzoyl peroxide, and lauroyl peroxide. If required and necessary, chain transfer agents such as mercaptan can be used in this radical copolymerization.

According to the present invention, at least a part of the crosslinking polymer supported on a porous film is swollen in an electrolyte solution or dissolves in an electrolyte solution at least around the interface between the porous film and electrodes to crosslink by cation polymerization and gel the electrolyte solution around the interface between the porous film and the electrodes, thereby adhering the electrodes to the porous film, as described hereinafter. Therefore, the gel formed by the crosslinking polymer together with the electrolyte solution is required to be one capable of adhering the electrodes and the porous film to each other.

In producing the 3-oxetanyl group-containing crosslinking polymer or the epoxy group-containing crosslinking polymer, the 3-oxetanyl group-containing radical-polymerizable monomer or the 3-epoxy group-containing radical-polymerizable monomer is used in an amount such that the respective total amount is 5-50% by weight, preferably 10-30% by weight, based on the weight of the whole monomers used. Therefore, in the case of producing the 3-oxetanyl group-containing crosslinking polymer, the 3-oxetanyl group-containing radical-polymerizable monomer is used in an amount of 5-50% by weight, preferably 10-30% by weight, based on the weight of the whole monomers used. Similarly, in the case of producing the epoxy group-containing crosslinking polymer, the epoxy group-containing radical-polymerizable monomer is used in an amount of 5-50% by weight, preferably 10-30% by weight, based on the weight of the whole monomers used.

In the case of producing a crosslinking polymer containing 3-oxetanyl group and epoxy group by using 3-oxetanyl group-containing radical-polymerizable monomer and epoxy group-containing radical-polymerizable monomer in combination and copolymerizing those monomers with other radical-polymerizable monomer, those monomers are used in an amount such that its total amount is 5-50% by weight, preferably 10-30% by weight, based on the weight of the whole monomers used. In this case of the combined use, the proportion of the epoxy group-containing radical-polymerizable monomer is 90% by weight or less based on the weight of the total amount of the 3-oxetanyl group-containing radical-polymerizable monomer and epoxy group-containing radical-polymerizable monomer.

In producing the 3-oxetanyl group-containing crosslinking polymer, epoxy group-containing crosslinking polymer or crosslinking polymer containing 3-oxetanyl group and epoxy group, if the amount of the 3-oxetanyl group-containing radical-polymerizable monomer, the amount of the epoxy group-containing radical-polymerizable monomer or the total amount of 3-oxetanyl group-containing radical-polymerizable monomer and epoxy group-containing radical-polymerizable monomer is less than 5% by weight based on the weight of the whole monomers used, the amount of the respective crosslinking polymer required for the gelation of the electrolyte solution increases as described above. As a result, the performance of the resulting battery deteriorates. On the other hand, if the respective amount is more than 50% by weight, the property to maintain the electrolyte solution in a form of a gel deteriorates. As a result, the adhesiveness between the electrodes and the separator in the resulting battery deteriorates.

The 3-oxetanyl group and/or epoxy group-containing crosslinking polymer preferably has a weight average molecular weight of 10,000 or more. If the weight average molecular weight is smaller than 10,000, a larger amount of the crosslinking polymers is required for the gelation of the electrolyte solution, resulting in deterioration of the performance of the battery obtained. The upper limit of the weight average molecular weight is not particularly limited. However, the upper limit is about 3,000,000, and preferably 2,500,000, so as to maintain the electrolyte solution in the gel form. The 3-oxetanyl group and/or epoxy group-containing crosslinking polymer further preferably has a weight average molecular weight of 100,000-2,000,000.

A method of supporting the crosslinking polymer on the porous film is not particularly limited. For example, the crosslinking polymer is dissolved in an appropriate organic solvent such as acetone, ethyl acetate or butyl acetate to prepare a crosslinking polymer solution, this solution is applied to the surface of a porous film by casting or spray coating, or a porous film is dipped in the crosslinking polymer solution, and the porous film thus treated is dried to remove the organic solvent.

Another method is that the crosslinking polymer is molded into a film by melt extrusion, and this film is laminated on the porous film substrate by thermal lamination and the like.

The method for producing a battery using the thus obtained crosslinking polymer-supported porous film according to the present invention is described below.

Electrodes are laminated on or are wound around the crosslinking polymer-supported porous film, and preferably, electrodes and the crosslinking polymer-supported porous film are heat bonded, to obtain a laminate of electrodes/crosslinking polymer-supported porous film. The laminate is placed in a battery container comprising a metal can or a laminate film. If required and necessary, terminals are welded. A given amount of an electrolyte solution having a cation polymerization catalyst dissolved therein is poured in the battery container. The battery container is sealed or the opening of the battery container is sealed. At least a part of the crosslinking polymer supported on the porous film is swollen at least around the interface between the porous film and the electrodes in the electrolyte solution or dissolves in the electrolyte solution. The crosslinking polymer is crosslinked by cation polymerization to gel at least a part of the electrolyte solution, thereby adhering the electrodes and the porous film. Thus, a battery in which the electrodes are strongly adhered to the porous film as a separator can be obtained.

The crosslinking polymer can satisfactorily function to adhere the electrodes to the porous film by the crosslinking thereof via cation polymerization. Therefore, the crosslinking polymer is not required to gel the whole electrolyte solution.

The crosslinking polymer can be cation polymerized at ordinary temperature for crosslinking, although depending on the structure thereof, the amount of the crosslinking polymer supported on the porous film, and the type and amount of the cation polymerization catalyst. The cation polymerization can be promoted by heating. In this case, heating is generally conducted at a temperature of about 40-100° C. for about 0.5-24 hours, although depending on the thermal resistance of materials constituting the battery and productivity of the battery. To swell or dissolve the polymer in an amount sufficient to adhere the electrodes to the porous film, the battery container may be allowed to stand at ordinary temperature for about several hours after pouring the electrolyte solution in the battery container.

The laminate of the electrodes/crosslinking polymer-supported porous film is satisfactory as long as the electrodes are simply laminated on the crosslinking polymer-supported porous film. Therefore, for example, negative electrode/porous film/positive electrode, negative electrode/porous film/positive electrode/porous film, and the like can be used as the laminate of the electrodes/crosslinking polymer-supported porous film according to the structure and form of the battery.

The electrolyte solution is a solution prepared by dissolving an electrolyte salt in an appropriate organic solvent. The electrolyte salt that can be used is, for example, salts comprising a cation component and an anion component. The cation component is derived from, for example, hydrogen, alkali metals (such as lithium, sodium or potassium), alkaline earth metals (such as calcium or strontium), or tertiary or quaternary ammonium ions. The anion component is derived from, for example, inorganic acids (such as hydrochloric acid, nitric acid, phosphoric acid, sulfuric acid, fluoroboric acid, hydrofluoric acid, hexafluorophosphoric acid or perchloric acid), or organic acids (such as carboxylic acid, organic sulfonic acid or fluorine-substituted organic sulfonic acid). Of those, electrolyte salts containing alkali metal ions as cation components are particularly preferably used.

Examples of the electrolyte salts containing alkali metal salts as cation components include alkali metal perchlorates, such as lithium perchlorate, sodium perchlorate or potassium perchlorate; alkali metal tetrafluoroborates, such as lithium tetrafluoroborate, sodium tetrafluoroborate or potassium tetrafluoroborate; alkali metal hexafluorophosphatets, such as lithium hexafluorophosphate or potassium hexafluorophosphate; alkali metal trifluoroacetates, such as lithium trifluoroacetate; and alkali metal trifluoromethanesulfonates, such as lithium trifluoromethanesulfonate.

In particular, in the case of producing lithium ion secondary battery in accordance with the present invention, lithium hexafluorophosphate, lithium tetrafluoroborate, lithium perchlorate or the like is suitably used as the electrolyte salt.

The solvent used for the above electrolyte salts can be any solvent so long as it can dissolve the electrolyte salt. Representative example of the solvent is a non-aqueous solvent, and examples thereof include cyclic esters such as ethylene carbonate, propylene carbonate, butylene carbonate or γ-butyrolactone; ethers such as tetrahydrofuran or dimethoxyethane; and chain esters such as dimethyl carbonate, diethyl carbonate or ethyl methyl carbonate. Those can be used alone or as mixtures of two or more thereof.

The amount of the electrolyte salts used is appropriately determined depending on the type and amount of a solvent used. The electrolyte salts are generally used in an amount such that the resulting gel electrolyte has the electrolyte salt concentration of 1-50% by weight.

Onium salts are preferably used as the cation polymerization catalyst. Examples of the onium salt includes onium salts comprising cation components such as ammonium ion, phosphonium ion, arsonium ion, stibonium ion or iodonium ion, and anion components such as tetrafluoroborate, hexafluorophosphate, trifluoromethanesulfonate or perchlorate.

Of those electrolyte salts, lithium tetrafluoroborate and lithium hexafluorophosphate per se function as a cation polymerization catalyst. Therefore, those are particularly preferably used as an electrolyte salt functioning as both electrolyte salt and cation polymerization initiator. In this case, lithium tetrafluoroborate and lithium hexafluorophosphate may be used alone or as a mixture thereof.

The present invention is described in more detail by reference to the following Examples, but it should be understood that the invention is not construed as being limited thereto. Unless otherwise indicated, all parts are by weight.

Properties of a porous film substrate and battery properties are evaluated as follows.

Thickness of Porous Film

The thickness of a porous film was determined by measurement with a 1/10,000 mm thickness gauge and based on a scanning type electron micrograph (magnification: 10,000) of a cross section of a porous film.

Porosity of Porous Film

Based on the weight "W" (g) per unit area "S" (cm$^2$) of porous film, the mean thickness "t" (cm) thereof, and the density "d" (g/cm$^3$) of a resin constituting a porous film, the porosity was calculated by the following equation:

Porosity (%)=[1−(100 $W/S/t/d$)]×100

Air Permeability of Porous Film

The permeability was determined according to JIS P 8117.

Puncture Strength

Puncture test was conducted with a compression tester KES-G5 manufactured by Kato Tech K.K. The maximum load was read from a load-deformation curve obtained from the measurement and was defined as puncture strength. A needle used had a diameter of 1.0 mm and a radius of curvature at the tip of 0.5 mm, and the needle was penetrated at a rate of 2 cm/second.

Reference Example 1

Preparation of Electrode Sheet

85 Parts of lithium cobalt oxide as a positive electrode active material (Cell Seed C-10 manufactured by Nippon Chemical Industrial Co., Ltd.), 10 parts of acetylene black as a conductive auxiliary agent (Denka Black manufactured by Denki Kagaku Kogyo Kabushiki Kaisha) and 5 parts of a vinylidene fluoride resin as a binder (KF polymer L #1120 manufactured by Kureha Chemical Industry, Co., Ltd.) were mixed together. Using N-methyl-2-pyrrolidone, a slurry of the resulting mixture was prepared so as to have a solid concentration of 15% by weight. The slurry was applied to one side of a 20 μm thick aluminum foil (current collector) at a build-up of 200 μm, dried at 80° C. for 1 hour and then at 120° C. for 2 hours, and pressed with a roll press, to prepare a positive electrode sheet having an active material layer thickness of 100 μm.

80 Parts of mesocarbon microbeads as a negative electrode active material (MCMB 6-28 manufactured by Osaka Gas Chemical Co., Ltd.), 10 parts of acetylene black as a conductive auxiliary agent (Denka Black manufactured by Denki Kagaku Kogyo Kabushiki Kaisha) and 10 parts of a vinylidene fluoride resin as a binder (KF polymer L #1120 manufactured by Kureha Chemical Industry, Co., Ltd.) were mixed. Using N-methyl-2-pyrrolidone, a slurry of the resulting mixture was prepared so as to have a solid concentration of 15% by weight. The slurry was applied to one side of a 20 μm thick copper foil (current collector) at a build-up of 200 μm, dried at 80° C. for 1 hour and then at 120° C. for 2 hours, and pressed with a roll press, to prepare a negative electrode sheet having an active material layer thickness of 100 μm.

Preparation of Reference Battery

A polyethylene resin-made porous film (separator) having a thickness of 16 μm, a porosity of 40%, an air permeability of 300 second/100 cc and a puncture strength of 3.0N was provided. The negative sheet obtained in Reference Example 1, the porous film provided above and the positive electrode sheet obtained in Reference Example 1 were laminated in this order. The resulting laminate was placed in an aluminum laminate package. An electrolyte solution containing an ethylene carbonate/diethyl carbonate (1:1 in weight ratio) mixed solvent dissolving lithium hexafluorophosphate therein at a concentration of 1.0 mol/liter was poured into the package. The package was sealed to assemble a lithium ion secondary battery. The battery was charged and discharged at a rate of 0.2 CmA three times. Subsequently, the battery was further charged at 0.2 CmA and then discharged at 2 CmA, to determine the 2 CmA-discharge capacity A.

Discharge Characteristics of Batteries of Examples or Comparative Examples

Coin-type lithium ion secondary batteries obtained in the following Examples and Comparative Examples were charged and discharged at a rate of 0.2 CmA three times. Subsequently, the batteries were further charged at 0.2 CmA and then discharged at 2 CmA, to determine the 2 CmA-discharge capacity B/. Battery characteristics were evaluated on the basis of the percentage (%) of the discharge capacity B to the discharge capacity A of the reference battery.

Production Example 1

Production of 3-Oxetanyl Group-Containing Crosslinking Polymer A (Weight Average Molecular Weight: 518,000 and Content of 3-Oxetanyl Group-Containing Monomer Content: 25% by Weight)

60.0 g of methyl methacrylate, 20.0 g of 3-ethyl-3-oxetanylmethyl methacrylate, 158.0 g of ethyl acetate and 0.16 g of N,N'-azobisisobutyronitrile were placed in a 500 ml three-necked flask equipped with a reflux condenser, and mixed for 30 minutes under stirring while introducing nitrogen gas. Radical polymerization was initiated at 60° C. When about 2 hours passed, the viscosity of the reaction mixture began to increase. The reaction mixture was further polymerized for additional 8 hours. The reaction mixture was cooled to about 10° C., and 0.16 g of azobisbutyronitrile was added thereto. The resulting mixture was again heated to 70° C., and polymerization was conducted for 8 hours.

After completion of the reaction, the reaction mixture was cooled to about 40° C., and 295 g of ethyl acetate was added thereto. The resulting mixture was mixed under stirring until the mixture became wholly homogenous, thereby obtaining an ethyl acetate solution of the oxetanyl group-containing crosslinking polymer A (concentration: 15% by weight).

100 g of the polymer solution was introduced in 600 ml of methanol under stirring with a high-speed mixer to precipitate the polymer. The polymer was filtered off and recovered. After rinsing the polymer with methanol several times, the polymer was dried in a drying tube while flowing dry nitrogen gas (a dew point: −150° C. or lower) prepared by vaporizing liquid nitrogen, and was further dried in a desiccator in vacuum for 6 hours, to obtain 3-oxetanyl group-containing crosslinking polymer A in white powder. As a result of molecular weight measurement by GPC, the polymer had a weight average molecular weight of 518,000 and a number average molecular weight of 231,000.

Production Example 2

Production of 3-oxetanyl Group-Containing Crosslinking Polymer B (Weight Average Molecular Weight: 253,000 and Content of 3-oxetanyl Group-Containing Monomer Component: 15% by Weight)

In the same manner as in the Production Example 1, 68.0 g of methyl methacrylate, 12.0 g of 3-ethyl-3-oxetanylmethyl methacrylate, 158.0 g of ethyl acetate and 0.15 g of N,N'-azobisisobutyronitrile were placed in a 500 ml three-necked flask equipped with a reflux condenser, and mixed for 30 minutes under stirring while introducing nitrogen gas. Radical polymerization was initiated at 70° C. When about 1.5 hours passed, the viscosity of the reaction mixture began to increase. The reaction mixture was further polymerized for additional 8 hours. The reaction mixture was cooled to about 40° C., and 0.15 g of azobisbutyronitrile was added thereto. The resulting mixture was again heated to 70° C., and polymerization was conducted for 8 hours.

After completion of the reaction, the reaction mixture was cooled to about 40° C., and 162 g of ethyl acetate was added thereto. The resulting mixture was mixed under stirring until the mixture was wholly homogenous, thereby obtaining an ethyl acetate solution of the oxetanyl group-containing crosslinking polymer B (concentration: 20% by weight).

In the same manner as in the Production Example 1, a polymer was precipitated from the polymer solution, and the polymer was filtered off and recovered. After rinsing the polymer several times, the polymer was dried to obtain 3-oxetanyl group-containing crosslinking polymer B in white powder. As a result of molecular weight measurement by GPC, the polymer had a weight average molecular weight of 253,000 and a number average molecular weight of 147,000.

Production Example 3

Production of 3-oxetanyl Group-Containing Crosslinking Polymer C (Weight Average Molecular Weight: 167,000 and Content of 3-oxetanyl Group-Containing Monomer Component: 40% by Weight)

48.0 g of methyl methacrylate, 32.0 g of 3-ethyl-3-oxetanylmethyl methacrylate, 58.0 g of ethyl acetate and 0.36 g of N,N'-azobisisobutyronitrile were charged in a 500 ml three-neck flask equipped with a reflux condenser, for mixing were placed in a 500 ml three-necked flask equipped with a reflux condenser, and mixed for 30 minutes under stirring while introducing nitrogen gas, in the same manner as in the Production Example 1. Radical polymerization was initiated at 70° C. When about 1.5 hours passed, the viscosity of the reaction mixture began to increase. The reaction mixture was further polymerized for additional 8 hours. The reaction mixture was cooled to about 40° C., and 0.36 g of azobisbutyronitrile was added thereto. The resulting mixture was again heated to 70° C., and polymerization was conducted for 8 hours.

After completion of the reaction, the reaction mixture was cooled to about 40° C., and 82 g of ethyl acetate was added thereto. The resulting mixture was mixed under stirring until the mixture became wholly homogenous, thereby obtaining an ethyl acetate solution of the oxetanyl group-containing crosslinking polymer C (concentration: 25% by weight).

In the same manner as in the Production Example 1, the polymer was precipitated from the polymer solution, filtered off and recovered. After rinsing the polymer several times, the polymer was dried to obtain 3-oxetanyl group-containing crosslinking polymer C in white powder. As a result of molecular weight measurement by GPC, the polymer had a weight average molecular weight of 167,000 and a number average molecular weight of 80,000.

Production Example 4

Production of Epoxy Group-Containing Crosslinking Polymer D (Weight Average Molecular Weight: 466,000 and Content of Epoxy Group-Containing Monomer Component: 25% by Weight)

In the same manner as in the Production Example 1, 60.0 g of methyl methacrylate, 20.0 g of 3,4-epoxycyclohexyl-methyl methacrylate, 158.0 g of ethyl acetate and 0.32 g of N,N'-azobisisobutyronitrile were placed in a 500 ml three-necked flask-equipped with a reflux-condenser, and mixed for 30 minutes under stirring while introducing nitrogen gas. Radical polymerization was initiated at 70° C. When about one hour passed, the viscosity of the reaction mixture began to increase. The reaction mixture was further polymerized for additional 8 hours. The reaction mixture was cooled to about 40° C., and 0.32 g of azobisbutyronitrile was added thereto. The resulting mixture was again heated to 70° C., and polymerization was conducted for 8 hours.

After completion of the reaction, the reaction mixture was cooled to about 40° C., and 162 g of ethyl acetate was added thereto. The resulting mixture was mixed under stirring until the mixture became wholly homogenous, thereby obtaining an ethyl acetate solution of the epoxy group-containing crosslinking polymer D (concentration: 15% by weight).

In the same manner as in the Production Example 1, the polymer was precipitated from the polymer solution, filtered off and recovered. After rinsing the polymer several times, the polymer was dried to obtain epoxy group-containing crosslinking polymer D in white powder. As a result of molecular weight measurement by GPC, the polymer had a weight average molecular weight of 466,000 and a number average molecular weight of 228,000.

Production Example 5

Production of 3-oxetanyl Group-Containing Crosslinking Polymer E (Weight Average Molecular Weight: 812,400 and Content of 3-oxetanyl Group-Containing Monomer Component: 25% by Weight)

2.0 g of completely saponified polyvinyl alcohol (weight average molecular weight: 2,000 and degree of saponification: 99 mol %), 0.05 g of partially saponified polyvinyl alcohol (weight average molecular weight: 2,000 and degree of saponification: 80 mol %) and 210 g of pure water were placed in a 500 ml three-necked flask equipped with a reflux condenser, and stirred at 90° C. for 15 minutes to dissolve the polyvinyl alcohols. The resulting solution was cooled to 40° C.

A separately prepared mixture of 60.0 g of methyl methacrylate, 20.0 g of 3-ethyl-3-oxetanylmethyl methacrylate, 0.15 g of a 10% solution of 1-dodecanethiol in ethyl acetate and 0.8 g of N,N'-azobisisobutyronitrile was added to the polyvinyl alcohol solution, and the resulting solution was mixed for 30 minutes under stirring while introducing nitrogen gas. Radical polymerization of the solution was conducted at 70° C. for 8 hours while stirring slightly strongly.

After completion of the reaction, the reaction mixture was cooled to about 40° C., followed by suction filtration and drying, to obtain a polymer in spherical fine particle. The polyvinyl alcohol attached to the polymer was rinsed off. Specifically, the polymer was placed in a separate 500 ml flask, and 400 ml of pure water was added thereto. The resulting mixture was heated to 90° C. At that temperature, the mixture was stirred for about 15 minutes and then cooled to about 40° C., followed by suction filtration and rinsing with pure water. After the rinsing procedure was repeated three times, suction filtration and rinsing with pure water were conducted. Finally, rinsing with methanol was conducted several times. The polymer was dried in a drying tube while flowing dry nitrogen gas (a dew point: −150° C. or lower) prepared by vaporizing liquid nitrogen, and further dried in a desiccator in vacuum for 6 hours, to obtain 3-oxetanyl group-containing crosslinking polymer E in white spherical particle. As a result of molecular weight measurement by GPC, the polymer had a weight average molecular weight of 821,400 and a number average molecular weight of 292,400.

Example 1

10 g of the 3-oxetanyl group-containing crosslinking polymer A was added to 90 g of ethyl acetate, and the resulting mixture was stirred at room temperature to obtain a homogenous crosslinking polymer solution. The crosslinking polymer solution was applied to both sides of a polyethylene resin porous film substrate (film thickness: 16 μm, porosity: 40%, air permeability: 300 seconds/100 cc and puncture strength: 3.0 N) with a wire bar (#20), and heat dried at 50° C. to volatilize ethyl acetate. Thus, a crosslinking polymer-supported porous film having the 3-oxetanyl group-containing crosslinking polymer supported thereon at a build-up of 2.5 μm and a coating density of 3.0 g/m$^2$ per one side was obtained.

The negative electrode sheet obtained in the Reference Example 1, the crosslinking polymer-supported porous film obtained above and the positive electrode sheet obtained in the Reference Example 1 were laminated in this order, and press bonded at a temperature of 80° C. under a pressure of 5 kg/cm$^2$ for 1 minute. Thus, a laminate of the separator/electrodes was obtained. The laminate of the separator/electrodes was placed in an aluminum laminate package, and an electrolyte solution of an ethylene carbonate/diethyl carbonate (1:1 in weight ratio) mixed solvent dissolving lithium hexafluorophosphate at a concentration of 1.0 mol/liter was poured in the package. The package was sealed. The package was heated at 70° C. for 7 hours to perform cation polymerization and crosslinking of the 3-oxetanyl group-containing polymer A, thereby adhering the electrode sheets to the porous film (separator) and at the same time, partially gelling the electrolyte solution. Thus, a laminate seal-type battery was obtained.

The 2 CmA discharge capacity of this battery was 96% of the discharge capacity of the reference battery. The battery was disassembled to measure the adhesive force between the positive electrode sheet and the separator. As a result, the adhesive force was 0.20 N/cm.

Example 2

A laminate seal-type battery was obtained in the same manner as in Example 1 except for using the 3-oxetanyl group-containing polymer B in place of the 3-oxetanyl group-containing polymer A. The 2 CmA discharge capacity of this battery was 95% of the discharge capacity of the reference battery. The battery was disassembled to measure the adhesive force between the positive electrode sheet and the separator. As a result, the adhesive force was 0.25 N/cm.

Example 3

A laminate seal-type battery was obtained in the same manner as in Example 1 except for using the 3-oxetanyl group-containing polymer C in place of the 3-oxetanyl group-containing polymer A. The 2 CmA discharge capacity of this battery was 95% of the discharge capacity of the reference battery. The battery was disassembled to measure the adhesive force between the positive electrode sheet and the separator. As a result, the adhesive force was 0.20 N/cm.

Example 4

A laminate seal-type battery was obtained in the same manner as in Example 1 except for using the epoxy group-containing polymer D in place of the 3-oxetanyl group-containing polymer A. The 2 CmA discharge capacity of this battery was 93% of the discharge capacity of the reference battery. The battery was disassembled to measure the adhesive force between the positive electrode sheet and the separator. As a result, the adhesive force was 0.30 N/cm.

Example 5

A laminate seal-type battery was obtained in the same manner as in Example 1 except for using the 3-oxetanyl group-containing polymer E in place of the 3-oxetanyl group-containing polymer A. The 2 CmA discharge capacity of this battery was 93% of the discharge capacity of the reference battery. The battery was disassembled to measure the adhesive strength between the positive electrode sheet and the separator. As a result, the adhesive force was 0.30 N/cm.

Comparative Example 1

10 g of poly(vinylidene fluoride/hexafluoropropylene) copolymer (Kynar 2801 manufactured by Atofina Chemicals, Inc.) was dissolved in 90 g of N-methyl-2-pyrrolidone to prepare a polymer solution having a concentration of 10% by weight. The polymer solution was applied to both sides of a polyethylene resin porous film (film thickness: 16 μm, porosity: 40%, air permeability: 30 seconds/100 cc and puncture strength: 3.0 N) with a wire bar (#20), and heat dried at 60° C. to volatilize N-methyl-2-pyrrolidone. As a result, a polyethylene resin porous film having the poly (vinylidene fluoride/hexafluoropropylene) copolymer supported on both sides thereof was obtained.

The negative electrode sheet obtained in the Reference Example 1, the porous film having the poly (vinylidene fluoride/hexafluoropropylene) copolymer supported thereon obtained above and the positive electrode sheet obtained in the Reference Example 1 were laminated in this order, and press bonded at a temperature of 80° C. under a pressure of 5 kg/cm$^2$ for 1 minute, to obtain a laminate of the separator/electrodes. The laminate of the separator/electrodes was placed in an aluminum laminate package, and an electrolyte solution of an ethylene carbonate/diethyl carbonate (1:1 in weight ratio) mixed solvent dissolving lithium hexafluorophosphate at a concentration of 1.0 mol/liter was poured in the package. The package was sealed to obtain a laminate seal-type battery.

The 2 CmA discharge capacity of this battery was 70% of the discharge capacity of the reference battery. The battery was disassembled to measure the adhesive force between the positive electrode sheet and the separator. As a result, the adhesive force was 0.20 N/cm.

Comparative Example 2

A laminate seal-type battery was obtained in the same manner as in Comparative Example 1 except for changing the concentration of the poly (vinylidene fluoride/hexafluoropropylene) copolymer solution to 5% by weight. The 2 CmA discharge capacity of the battery was 93% of the discharge capacity of the reference battery. The battery was disassembled to measure the adhesive force between the positive electrode sheet and the separator. As a result, the adhesive force was 0.05 N/cm.

It should further be apparent to those skilled in the art that various changes in form and detail of the invention as shown and described above may be made. It is intended that such changes be included within the spirit and scope of the claims appended hereto.

This application is based on Japanese Patent Application No. 2002-350223 filed Dec. 2, 2002, the disclosure of which is incorporated herein by reference in its entirety.

What is claimed is:

1. A method for producing a battery, comprising the following in order:
   coating a porous film with a solution comprising a crosslinking polymer having a 3-oxetanyl group,
   laminating electrodes on the porous film to prepare a laminate of the porous film and the electrodes
   placing the laminate in a battery container, and
   pouring an electrolyte solution containing a cation polymerization catalyst in the battery container to induce cation polymerization and crosslinking of the crosslinking polymer, thereby at least partially gelling the electrolyte solution to adhere the porous film and the electrodes,
   wherein the porous film comprises a polyolefin resin and
   wherein the crosslinking polymer has a weight average molecular weight of 100,000 to 2,000,000.

2. The method for producing battery as claimed claim 1, wherein the cation polymerization catalyst is an onium salt.

3. The method for producing battery as claimed in claim 1, wherein the electrolyte solution contains at least one member selected from the group consisting of lithium hexafluorophosphate and lithium tetrafluoroborate, as an electrolyte salt further functioning as a cation polymerization catalyst.

* * * * *